Nov. 22, 1955    E. B. A. SOKOLOSKI    2,724,390
DENTAL FLOSS DISPENSER
Filed March 17, 1954
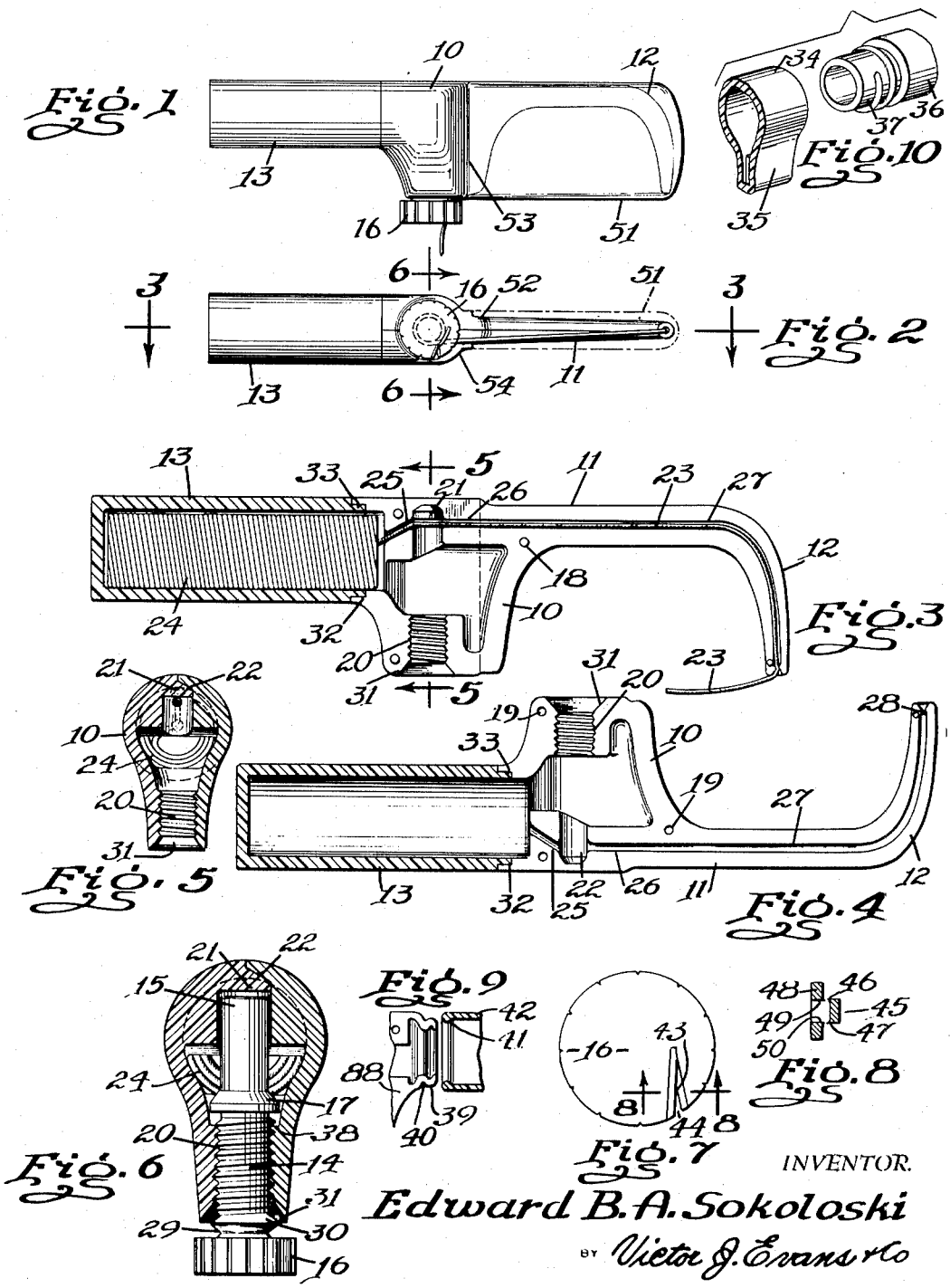
INVENTOR.
Edward B. A. Sokoloski
BY Victor J. Evans & Co
ATTORNEYS

United States Patent Office 2,724,390
Patented Nov. 22, 1955

2,724,390

DENTAL FLOSS DISPENSER

Edward B. A. Sokoloski, Madison, Wis.

Application March 17, 1954, Serial No. 416,856

4 Claims. (Cl. 132—92)

This invention relates to dental appliances, and in particular a dental floss dispenser and holder having a roll or spool of dental floss in a handle with the floss threaded through an extended overhanging finger and secured in tension in a gap between the extended end of the finger and handle by a thumb screw in the head of which a cutting blade is provided.

The purpose of this invention is to provide a dispenser for dental floss wherein the floss is retained in tension at one end of the dispenser by a thumb screw with one end of the thumb screw gripping the floss in the dispenser and with the extended end of the floss retained by friction under the head of the screw.

Various types of dispensers have been provided for dental floss and the like, however, with the conventional dispensers or holders for this use it is difficult to positively grip and hold the dental floss in tension for use without comparatively complicated gripping elements that increase the cost of the holder to such an amount that general use of the device is prohibitive. With this thought in mind this invention contemplates a dispenser having an arcuate finger extended from a tubular handle with dental floss threaded from a cavity in the handle through the finger and returned from the extended end of the finger to the head of a thumb screw threaded in a section at the base of the finger and in which the same thumb screw grips the floss between the cavity and finger.

The object of this invention is, therefore, to provide means for forming a dental floss dispenser whereby dental floss from a roll in a handle is retained in tension across a gap between the end of a finger extended from the handle and the adjacent end of the handle by a common thumb screw.

Another object of the invention is to provide a thumb screw for gripping dental floss between a reservoir in a handle of a dispenser and an extended finger and also from an extended end of the finger wherein movement of the thumb screw is regulated to coordinate gripping of the floss at both ends of the screw.

A further object of the invention is to provide a dental floss dispenser having a common thumb screw for gripping both ends of a strand of dental floss for retaining the strand in tension in which the dispenser is of a simple and economical construction.

With these and other objects and advantages in view, the invention embodies a dental floss dispenser including a tubular handle having a finger with an arcuate outer end extended from one end thereof and a thumb screw threaded in a portion of the dispenser between the finger and handle in which the inner end of the thumb screw is provided with a floss gripping tip, the intermediate portion of the screw is provided with a travel limiting shoulder and the outer end of the thumb screw is provided with a head having a cutting blade therein and a V-shaped annular groove on the inner side thereof for frictionally holding the extended end of the floss.

Other features and advantages of the invention will appear from the following description taken in connection with the drawing, wherein:

Figure 1 is a side elevational view showing the improved dental floss dispenser.

Figure 2 is a plan view of the dispenser with a cap or closure shown in broken lines over the finger extended from the handle.

Figure 3 is a longitudinal section through the dispenser taken on line 3—3 of Figure 2 showing one side of the device.

Figure 4 is a similar section taken on the same line and showing the opposite side of the device.

Figure 5 is a cross section through the dispenser taken on line 5—5 of Figure 3.

Figure 6 is a cross section through the dispenser taken on line 6—6 of Figure 2 with the parts shown on an enlarged scale.

Figure 7 is a plan view showing the head of the screw illustrating the position of the notch and floss cutting knife blade therein.

Figure 8 is a detail showing a section through the cutting blade, said section being taken on line 8—8 of Fig. 7.

Figure 9 is a detail showing a further modification in which the end of the handle is snapped into an annular recess in the end of the body of the dispenser.

Figure 10 is a detail illustrating a modification in which the body of the dispenser is provided with an internally threaded section and the handle is provided with a threaded nipple that is threaded in the body.

Referring now to the drawing wherein like reference characters denote corresponding parts the improved dental floss dispenser of this invention includes a body portion 10 having a finger 11 with an arcuate outer end 12 extended from one side with a container 13 providing a handle extended from the opposite side, and with a thumb screw 14 threaded therein and having an inner end providing a tip 15, a head 16 on the outer end, and an annular shoulder 17 intermediate of the ends.

It is preferred to make the body portion 10 and finger in two complementary halves, as illustrated in Figures 3 and 4, and the half shown in Figure 3 is provided with pins 18 that are positioned to register with openings 19 in the half shown in Fig. 4 to provide positioning means to facilitate assembling the device.

The screw 14 is threaded into a threaded opening 20 in the body and the tip 15 is positioned to engage a platform 21 which extends from the part shown in Fig. 3 into a recess 22 in the part shown in Fig. 4, whereby with the dental floss, as indicated by the numeral 23 extended from the center of a roll 24 in the handle 13, through a passage 25 in the body, and also through a passage 26 to an opening 27 in the finger 11 it will extend over the platform 21 at which point it may be engaged by the tip 15 of the thumb screw whereby the floss is adapted to be gripped and held at this point.

From the extended end 12 of the finger 11, which is formed with an inner annular rim 28, to prevent passage of saliva or other fluid into the finger, the floss extends to the thumb screw 14 and the free end of the floss is snubbed in a V-shaped groove 29 at the base of the head 16. The screw is also provided with an annular shoulder 30 below the groove 29 to facilitate snubbing the floss, and the body 10 is provided with an annular recess 31 that is positioned to receive the shoulder as the screw is turned inwardly to grip the floss.

In the design shown in Figs. 3 and 4, the body 10 is provided with an annular recess 32 and a ring 33 on the inner end of the handle, which, in this design is tubular, is secured in the recess with a suitable adhesive, or the like. It will be understood that the handle may be integral with the body, or may be secured thereto by other suitable means. In the design shown in Fig. 10 a section 34 of a body 35, similar to the body 10, is threaded internally, and a handle or container 36 is provided with a threaded nipple 37 that is adapted to be threaded into the section 34, and in Fig. 9, a body 88, also similar to the body 10, is provided with an annular rim 39 with a recess 40 positioned over the rim, and an annular bead 41 on the end of a handle 42 is adapted to snap over the rim 39 and into the recess 40 to secure the handle or container on the body.

The head 16 of the thumb screw 14 is provided with a notch 43 in which a cutting knife 44 is positioned, and, as shown in Fig. 8, a blade 45 having upper and lower cutting edges 46 and 47 is struck from a plate 48 providing coacting cutting edges 49 and 50. With the cutting edges arranged in this manner a pull on the free or extended end of the floss causes the floss to be pinched between the lower edges 47 and 50 while it is cut by the upper cutting edges 46 and 49. With the floss pinched or held between the edges 47 and 50 it will be led into the groove 29 as the screw is turned in a clockwise direction.

The dispenser is provided with a cap or cover 51 which is frictionally held on a shoulder 52 of the body 10, and the edge 53 of the cap is tapered to correspond with a rim 54 of the body whereby the outer surface of the cap is flush with the surface of the body portion.

The cap may readily be removed as the dispenser is used and it will be understood that the cap may be formed so that it may be positioned over the handle as the device is used.

With the dental floss sterilized or treated with a suitable antiseptic and with the opening in the tip of the finger restricted it would be possible to retain the dispenser in a sterile condition.

The shoulder 17 is positioned to limit outward movement of the thumb screw 14 and with the shoulder 17 against a corresponding shoulder 38 in the body 10 the exact number of threads are provided whereby with an end of the floss started in the annular groove 29 and the thumb screw turned in a clockwise direction the tip 15 will clamp the floss against the platform 21 just before the last final turning movement of the screw to clamp the dental floss against the end of the body.

Furthermore, with the shoulder 17 in engagement with the shoulder 38 the notch 43 and cutting blade in the head 16 are positioned to one side of the longitudinal center of the dispenser and on the side of the screw opposite to that from which the finger extends, whereby with the free end of the floss gripped between the thumb and forefinger of a user the floss may readily be cut and in this action the end of the floss is pinched in the lower edges of the cutting blade, whereby upon rotating the screw in a clockwise direction the floss will be snubbed in the groove under the head.

After use the screw is turned in a counter-clockwise direction, whereby the floss is released and the used portion gripped by the thumb and forefinger of a hand. The floss is then advanced until the used portion passes the screw and the used portion is drawn into the notch 43 to cut the floss by the blade 44, leaving a strand of unused floss extended between the finger 11 and screw 14.

After the floss is used from the dispenser handle or container a new roll or spool of floss may be inserted in the handle and the free end threaded through the body portion and finger, or the free end of the floss may be tied to the end of floss remaining in the dispenser whereby floss from a new spool or roll may readily be drawn through the body and finger. It will be noted that the floss pulls straight across the platform and is drawn from the center of the spool or roll.

The handle or container is tapered from a small closed end to a larger open end to facilitate extracting the handle from molds and the like.

It will be understood that modifications, within the scope of the appended claims, may be made in the design and arrangements of the parts without departing from the spirit of the invention.

What is claimed is:

1. A dental floss dispenser comprising a handle having a finger with an arcuate outer end extended from one end providing a gap between the outer end of the finger and end of the handle, said handle having a cavity therein, and a thumb screw threaded in a portion of the handle between the cavity and finger and positioned at right angles to the longitudinal axis of the handle and finger whereby a tip on the inner end of the screw is adapted to grip floss extended from the cavity and threaded through the finger with an extended end of the floss frictionally held under a head on the outer end of the screw, said head of the screw having a notch with a cutting blade therein in one side.

2. A dental floss dispenser comprising a handle having a finger with an arcuate outer end extended from one end providing a gap between the outer end of the finger and end of the handle, said handle having a cavity therein, and a thumb screw threaded in a portion of the handle between the cavity and finger and positioned at right angles to the longitudinal axis of the handle and finger whereby a tip on the inner end of the screw is adapted to grip floss extended from the cavity and threaded through the finger with an end of the floss extended from the finger frictionally held in an annular V-shaped groove at the base of a head on the outer end of the screw.

3. A dental floss dispenser comprising a handle having a finger with an arcuate outer end extended from one end providing a gap between the outer end of the finger and end of the handle, said handle having a cavity therein, and a thumb screw threaded in a portion of the handle between the cavity and finger and positioned at right angles to the longitudinal axis of the handle and finger whereby a tip on the inner end of the screw is adapted to grip floss extended from the cavity and threaded through the finger with an end of the floss extended from the finger frictionally held in an annular V-shaped groove at the base of a head on the outer end of the screw, said screw having an annular shoulder thereon limiting outward movement of the screw.

4. In a dental floss dispenser, the combination of which comprises a handle having a cavity therein and having a finger with an arcuate extended end carried on one end thereof, said finger providing a gap between the arcuate extended end thereof and the end of the handle upon which the finger is carried, said finger having a longitudinally disposed opening extended therethrough, and a thumb screw threaded in a portion of the handle between the cavity and finger and positioned at right angles to the longitudinal axis of the handle and finger whereby a tip on the inner end of the screw is adapted to grip floss between the cavity and finger and whereby floss extended from the outer end of the finger is adapted to be frictionally held in an annular V-shaped groove at the base of a head on the outer end of the screw, said screw having an annular shoulder on the intermediate part thereof positioned to limit outward movement of the screw, and a cutting blade positioned in a notch in one side of the head of the screw.

References Cited in the file of this patent

UNITED STATES PATENTS

| | | |
|---|---|---|
| 1,205,732 | Groetchen | Nov. 21, 1916 |
| 1,480,101 | Ogden | Jan. 8, 1924 |
| 1,494,679 | Fischer et al. | May 20, 1924 |
| 1,833,671 | Byars | Nov. 24, 1931 |
| 1,879,074 | Cammack | Sept. 27, 1932 |
| 1,990,404 | Doner | Feb. 5, 1935 |
| 2,163,500 | Shepard | June 20, 1939 |
| 2,607,358 | Maas | Aug. 19, 1952 |